March 22, 1932.  R. J. NORTON  1,850,563
BRAKE STRUCTURE
Filed May 9, 1930
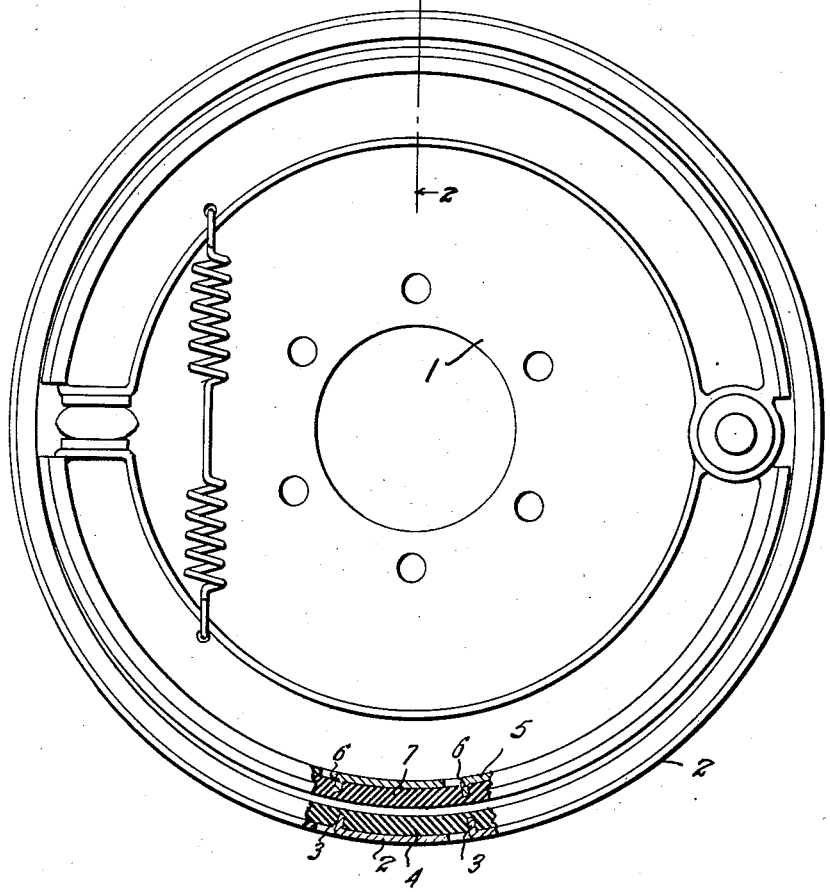
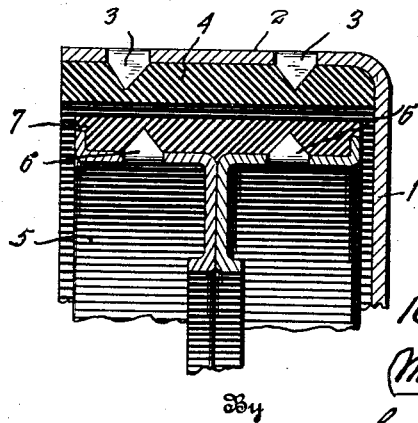
Inventor
Raymond J. Norton
M. W. McConkey,
By Semmes & Semmes
Attorneys Patented Mar. 22, 1932

1,850,563

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE STRUCTURE

Application filed May 9, 1930. Serial No. 451,117.

This invention relates to brake structures and more particularly to a brake having a novel frictional engaging surface.

The usual type of brake comprises a stamped low carbon steel drum with one surface of the braking flange of which is engaged a frictional material. This friction material usually comprises a woven or felted asbestos liner attached either to an internal expanding shoe or an external strap. In this type of structure, in order to insure efficient brake action, the curvature of the brake drum and friction material must be conformed to each other, so as to insure continuous contact throughout the contiguous circumferential surface. This necessitates a relatively accurate machining of the drum and buffing or grinding of the friction surface.

It is an object of the present invention to provide a brake structure in which the frictional engaging surfaces of the brake rotor and stator are uniform.

Another object is to provide a brake structure having frictional engaging portions comprising moulded sections.

Another object is to provide a brake drum having synthetic resin frictional engaging sections.

With these and other equally important objects in view, the invention comprises a brake structure including a drum and a cooperating non-rotating member upon each of which is formed a moulded friction surface and preferably of synthetic resin.

In order to make the invention more readily understood, a typical embodiment is shown in the accompanying drawings, in which—

Figure 1 is a side elevation of a brake assemblage.

Figure 2 is a section taken on line 2—2 of Figure 1.

In accordance with the present invention, the difficulties of accurately stamping a brake drum and of subsequently machining this member to obtain a desired curvature, and also of machining or grinding the friction surface on the shoe, are obviated. This is accomplished by providing moulded surfaces on both the shoe and drum. These surfaces may be moulded directly upon the shoe (or strap) and the drum, and the advantage of the accuracy of moulding operations secured.

The friction surfaces may comprise a woven or felted asbestos bonded with a synthetic resin. The synthetic resin may comprise a resin of the phenol-methylene type, or any other of the suitable synthetic resins, such as furfural, the acetylene resins, the urea resins, etc.

These materials may be made up by impregnating the woven or felted fibrous material with the fusible form of the resin, and then transforming the material to the infusible form under pressure. This transformation under pressure moulds the material in the final shape. If desired, the materials may be treated for a prolonged period at elevated temperatures, at or about 60° C. to preshrink the friction surfaces and to more accurately secure the desired clearance.

Such a structure is shown in the drawings. In these, the structure may comprise a brake drum including the head 1, and the continuous laterally extending braking flange 2. This flange may be provided with integral projections designated generally at 3 which serve to retain the friction surface 4 in position. The friction surface 4 may be applied to the metal of the drum in any desired manner, such, for example, as is described in copending application, Serial No. 445,508, filed April 18, 1930. In this moulding operation, it will be seen that the metal of the drum forms one section of the mould.

The non-rotating brake member may comprise a substantially T-shaped shoe 5, formed with angularly extending projections 6. These projections are enclosed within the moulded friction member 7 and are so disposed as to retain the latter against relative circumferential or radial movement. This member may be made up in any desired manner as, for example, according to the method described in copending application, Serial No. 324,362, filed December 7, 1928.

It will be appreciated that by proper choice of the respectively contacting friction surfaces, a wide range of braking effect may be obtained. Thus, for example, if it is desired to decrease the coefficient of friction between the two friction surfaces, one or the other, or both, may be permanently lubricated in the manner disclosed in the copending application, Serial No. 361,013, filed May 6, 1929. This permanent lubrication may be achieved by impregnating the fiber embodied in the resin with a lubricating oil or with a solid lubricant, such as powdered graphite.

In this manner, a novel type of brake, operating in a novel manner, is secured. In place of the old method of retardation by a metal to non-metal friction engagement, the new method involves a non-metal to non-metal friction engagement. Furthermore, the particular types of non-metallic friction surfaces contemplated present a wide permissible variation in frictional characteristics, and hence in braking effects. Thus, the two frictional surfaces 4 and 7 may be made up of the same resin or of different resins; one may be a resin bonded woven asbestos, and the other a resin bonded felted asbestos. As noted above, one or both of these surfaces may be permanently lubricated. Also, if desired, one or both of the friction surfaces may include adjuvants or incorporated substances which tend to increase the coefficient of friction. These materials which may, for example, be finely divided particles, may be incorporated during any suitable stage in the manufacture.

It is to be noted in addition that the desirable dielectric properties of the materials render them particularly suitable for use in brake mechanisms involving electrical circuits.

While there is described a particular embodiment of the invention, it is to be understood that this is merely given for the purpose of explaining the underlying principles herein involved. The novelty is considered to reside in the provision of a new method of braking or retardation by providing for non-metal to non-metal frictional contact and with materials which are not only eminently suited for braking purposes, but also permit of a wide range of variation so as to permit a considerable variance in braking effect.

Therefore, the invention is not considered to be limited to the particular materials described or the construction shown, except as such limitations are clearly imposed by the appended claims.

I claim:

1. A brake mechanism comprising rotatable and nonrotatable parts and resinous friction surfaces moulded on each part.

2. A brake mechanism comprising rotatable and nonrotatable cooperating members and resin bonded molded fibrous linings attached to each part.

3. A brake mechanism comprising rotatable and nonrotatable parts and resinoid friction surfaces at differential frictional characteristics associated with each part.

4. A brake mechanism comprising rotatable and nonrotatable parts and synthetic resin friction surfaces secured on each part, one of said surfaces being lubricated.

5. A brake mechanism comprising a drum having a friction surface moulded thereon and a cooperating shoe having a friction surface moulded thereon.

6. A brake mechanism comprising metallic members having non-metallic frictional engaging surfaces moulded thereon.

7. A brake mechanism including rotatable and nonrotatable parts having non-metallic permanently lubricated contact surfaces.

8. In a brake, coacting non-metallic molded friction surfaces having substantially the same physical characteristics and different frictional characteristics.

9. In a brake, coacting non-metallic molded friction surfaces having substantially the same physical characteristics at least one of which surfaces is permanently lubricated.

In testimony whereof I affix my signature.

RAYMOND J. NORTON.